United States Patent [19]

Hayakawa et al.

[11] Patent Number: 4,478,595
[45] Date of Patent: Oct. 23, 1984

[54] ELECTRIC CONTROL APPARATUS FOR BELT TENSIONERS

[75] Inventors: Hideyuki Hayakawa, Nishio; Kazuma Matsui, Toyohashi; Yoshiyuki Hattori, Toyoake; Hiroji Kinbara, Okazaki, all of Japan

[73] Assignee: Nippondenso Co., Ltd., Kariya, Japan

[21] Appl. No.: 361,616

[22] Filed: Mar. 25, 1982

[30] Foreign Application Priority Data

Mar. 27, 1981 [JP] Japan ................................ 56/45951

[51] Int. Cl.³ ............................................ F16H 7/12
[52] U.S. Cl. ........................... 474/109; 74/866; 474/110
[58] Field of Search ............... 474/101, 102, 103, 106, 474/107, 108, 109, 110, 136, 138; 74/866; 364/424.1

[56] References Cited

U.S. PATENT DOCUMENTS

| | | | |
|---|---|---|---|
| 3,018,667 | 1/1962 | Spietz | 474/109 |
| 3,496,918 | 2/1970 | Finlay | 474/137 X |
| 4,031,761 | 6/1977 | Fisher et al. | 474/101 |
| 4,193,315 | 3/1980 | Noe | 474/110 |
| 4,249,425 | 2/1981 | Watson | 474/110 |
| 4,261,229 | 4/1981 | Mizuno et al. | 74/866 |
| 4,276,038 | 6/1981 | Kraft | 474/110 |
| 4,277,240 | 7/1981 | Kraft | 474/110 |
| 4,283,181 | 8/1981 | Sproul | 474/110 |
| 4,284,192 | 8/1981 | Taylor | 474/109 |
| 4,350,057 | 9/1982 | Kishi et al. | 74/866 |
| 4,386,688 | 6/1983 | Sato et al. | 74/866 |
| 4,387,608 | 6/1983 | Mohl et al. | 74/866 |

FOREIGN PATENT DOCUMENTS 0006033 6/1979 European Pat. Off. ............. 74/866

Primary Examiner—Leslie A. Braun
Assistant Examiner—Dwight G. Diehl
Attorney, Agent, or Firm—Cushman, Darby & Cushman

[57] ABSTRACT

In combination with a belt tensioner which includes an idler pulley to be radially displaced under control of an actuator for applying an tensioning force on an endless belt of the drive system for the vehicle accessories, an electric control apparatus comprises a microcomputer for calculating the actual tensioning force on the belt related to radial displacement of the idler pulley and for calculating drive power necessary for driving the vehicle accessories to calculate total drive torque of the vehicle accessories in relation to rotational speed of a prime mover of the vehicle. The microcomputer also calculates an optimum tensioning force based on a desired relationship between the optimum tensioning force and the total drive torque in consideration with the maximum efficiency of power transmission of the belt such that it generates a control signal when the calculated actual tensioning force is different from the calculated optimum tensioning force. An electrically operated drive mechanism is responsive to the control signal from the microcomputer to operate the actuator in accordance with the difference between the calculated actual and optimum tensioning force.

6 Claims, 14 Drawing Figures

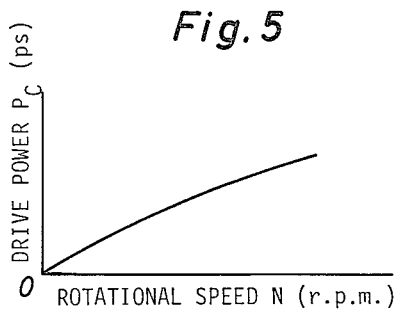
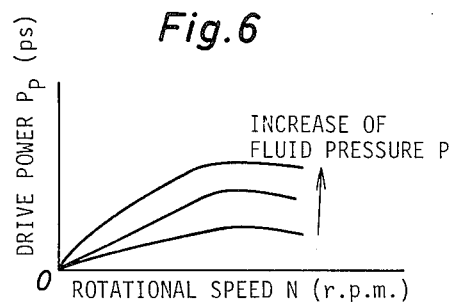
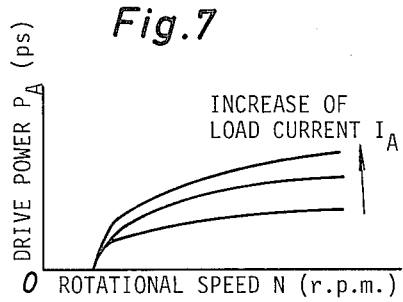
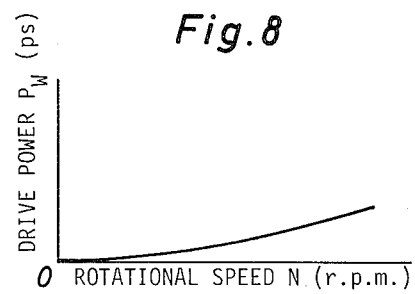
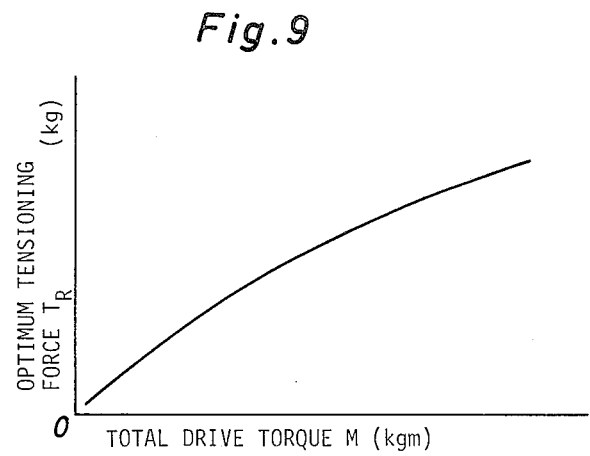

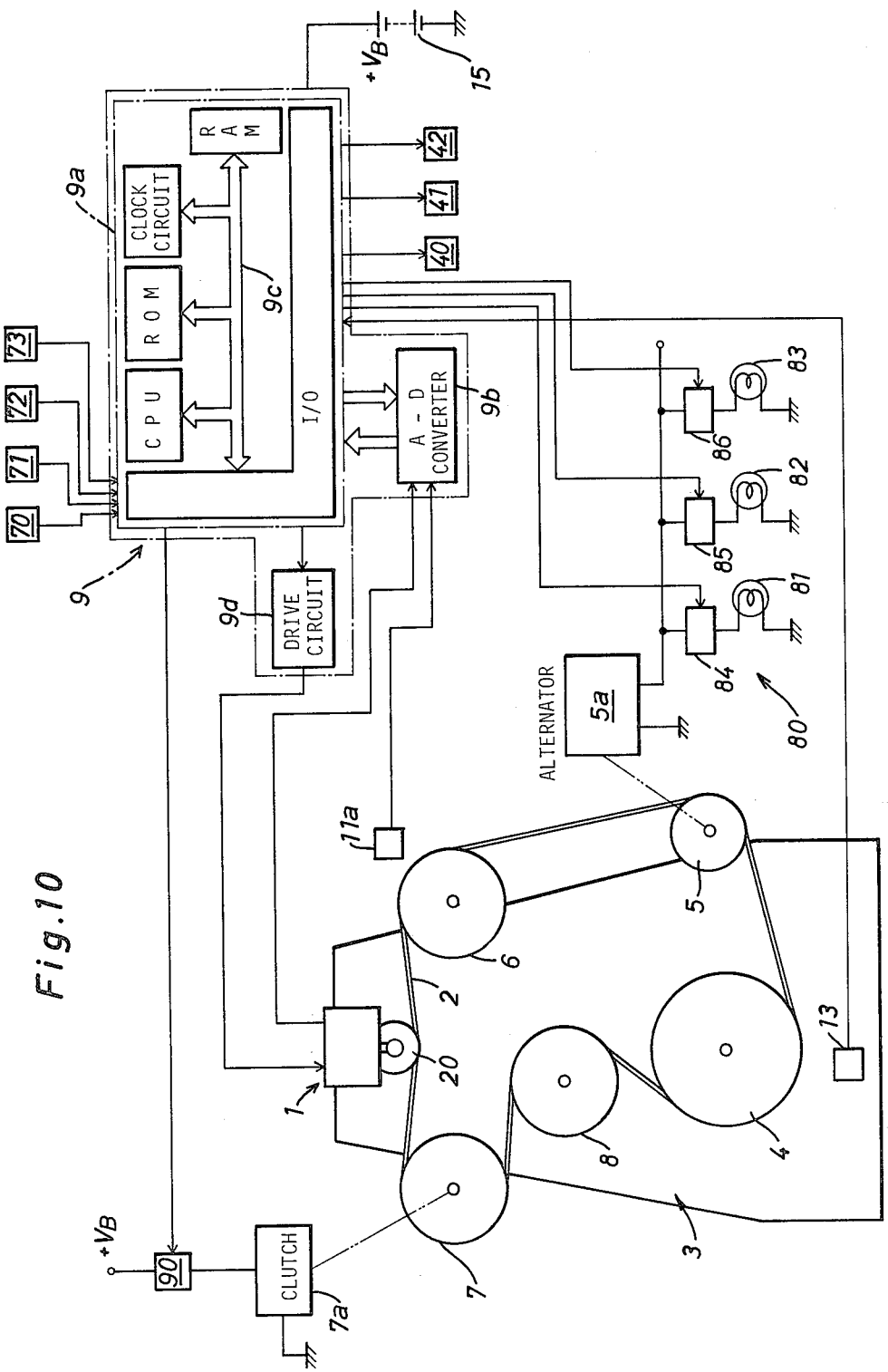

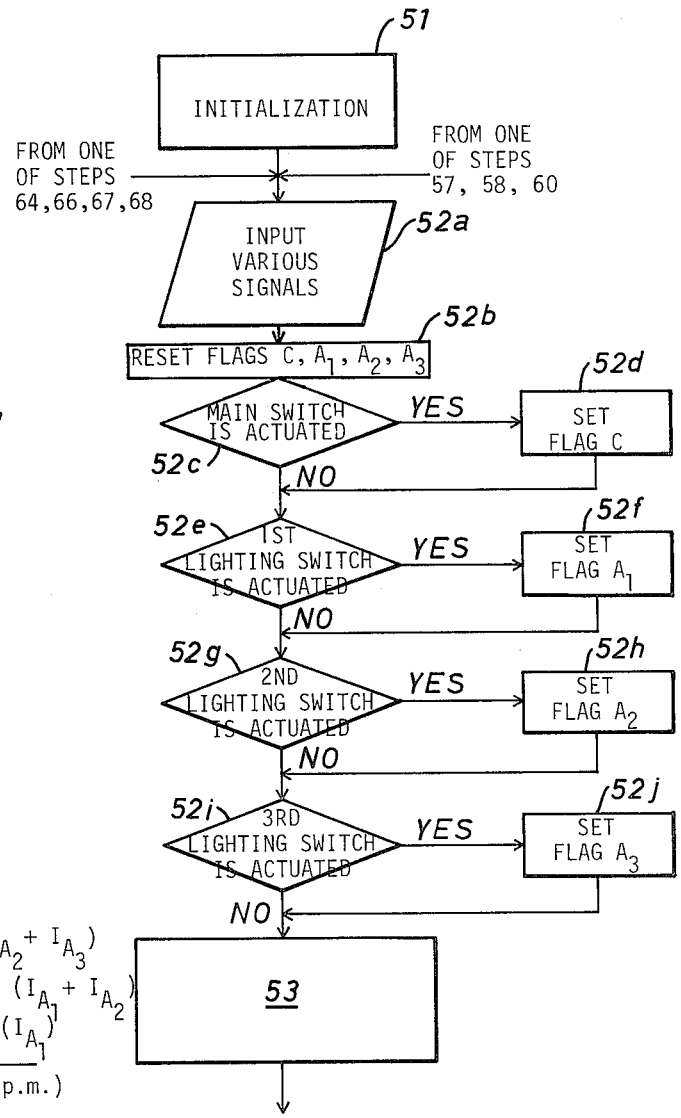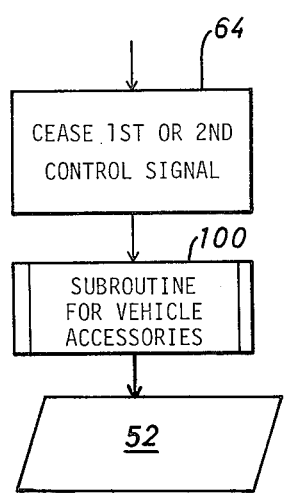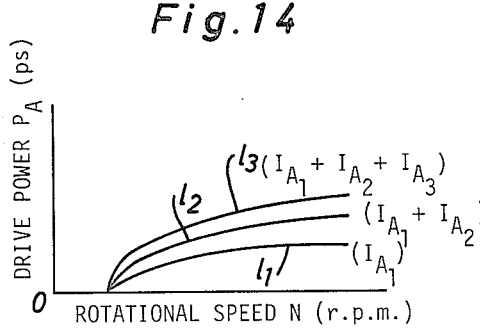

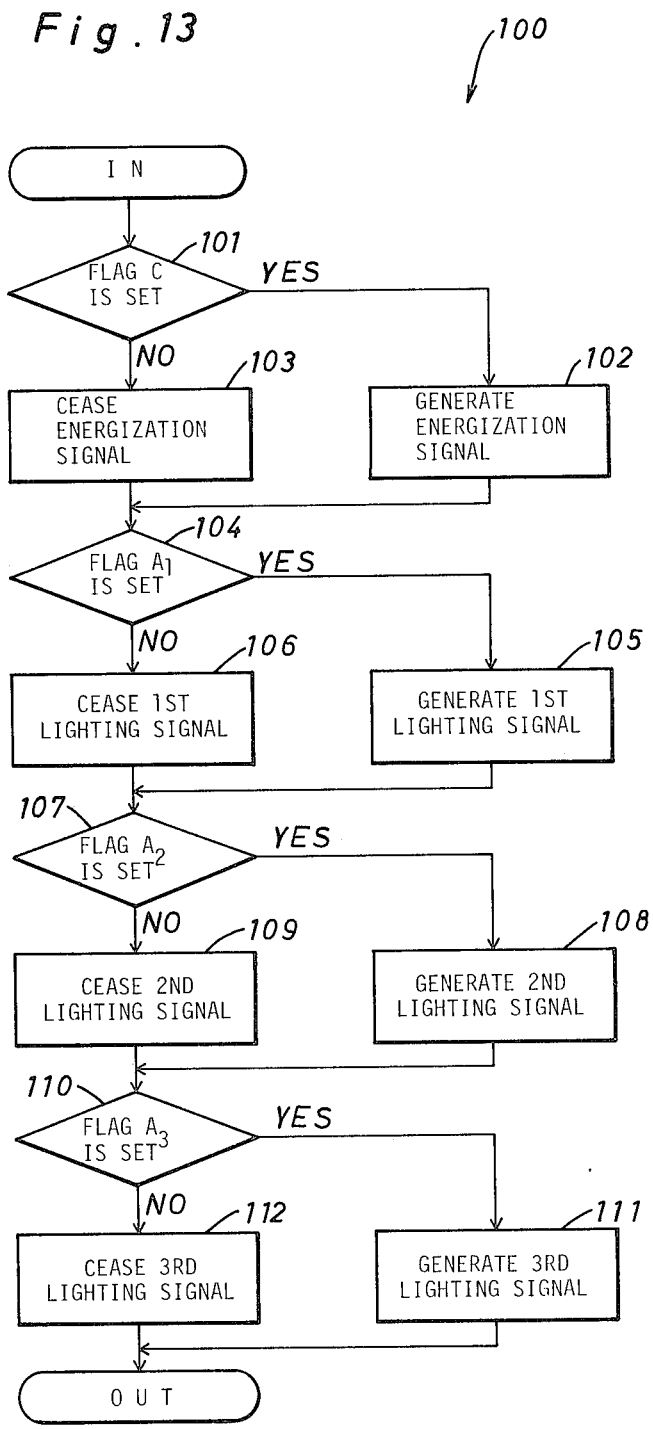

ELECTRIC CONTROL APPARATUS FOR BELT TENSIONERS

BACKGROUND OF THE INVENTION

The present invention relates to belt tensioners, and more particularly to a belt tensioner for use in automotive vehicles for automatically tensioning an endless belt of the drive system for such vehicle accessories as a water pump, a power steering pump, an alternator and the like.

In such a belt tensioner as described above, an initial tensioning force on the endless belt is adjusted by displaced position of an idler pulley or the vehicle accessories in engagement with the belt so that the belt does not slip in operation of the vehicle accessories under the maximum loaded condition. In operation of the vehicle accessories, however, a tensioning force on the belt for reliable power transmission to the vehicle accessories will differ in accordance with the driving condition of the vehicle, i.e. a relatively small tensioning force on the belt is required to transmit a small drive torque to the vehicle accessories from a prime mover of the vehicles, while a large tensioning force on the belt is required to transmit a large drive torque to the vehicle accessories from the prime mover. If a large drive torque is transmitted to the vehicle accessories under an insufficient initial tensioning force on the belt, there will occur slippage of the belt. If an excessive initial tensioning force acts on the belt, power transmission efficiency of the belt will decrease to increase fuel consumption.

As a result of experiments, it has been observed that a relationship between power transmission efficiency of the endless belt and total drive torque for the vehicle accessories in consideration with tensioning force on the belt is obtained as shown by characteristic curves A, B and C in FIG. 1. From the characteristic curves, it will be understood that when the total drive torque for the vehicle accessories is relatively small, a small tensioning force on the belt is effective to increase the power transmission efficiency of the belt, as is shown by the characteristic curve A. When the total drive torque for the vehicle accessories increases, medium and large tensioning forces on the belt are effective in sequence to increase the power transmission efficiency of the belt, as is shown by the characteristic curves B and C in FIG. 1. Based on the above facts, it is consequently noted that the maximum efficiency of power transmission in relation to the total drive torque for the vehicle accessories is obtainable by adjustment of the tensioning force on the belt as defined by a characteristic curve D in FIG. 1.

SUMMARY OF THE INVENTION

It is, therefore, the primary object of the present invention to provide an electric control apparatus for a belt tensioner for use in automotive vehicles which is capable of automatically adjusting a tensioning force on the belt in relation to variation of the drive torque for the vehicle accessories to effect the maximum power transmission to the vehicle accessories and to enhance the durability of the belt.

Another object of the present invention is to provide an electric control apparatus for a belt tensioner for use in automotive vehicles which is capable of adjusting an initial tensioning force on the belt under inoperative condition of a prime mover of the vehicle to effect the maximum power transmission of the belt at the initial stage in operation of the vehicle accessories.

A further object of the present invention is to provide an electric control apparatus for a belt tensioner for use in automotive vehicles which is capable of detecting an excessive tensioning force on the belt or an excessive stretch or disconnection of the belt to inform the operator of abnormal condition in operation of the belt drive system.

A still further object of the present invention is to provide an electric control apparatus for a belt tensioner, having the above-mentioned characteristics, which is capable of adjusting the tensioning force on the belt in relation to the drive torque for the vehicle accessories prior to energization of an electric load circuit of the vehicle to ensure the maximum efficiency of power transmission in accordance with increase of the loads on the vehicle accessories caused by energization of the electric load circuit.

According to the present invention, the above objects are accomplished by provision of an electric control apparatus for a belt tensioner device for use in automotive vehicles for automatically tensioning an endless belt of the drive system for the vehicle accessories, the belt tensioner including idler pulley means arranged to be in engagement with the endless belt to apply a tensioning force on the belt in accordance with radial displacement thereof, and actuator means operatively connected with the idler pulley means for displacing the idler pulley means toward and away from the belt in a radial direction.

The electric control apparatus comprises:

first means for generating a first signal indicative of the radial displacement of the idler pulley means;

second means for generating a second signal indicative of rotational speed of a prime mover of the vehicle;

third means for calculating the actual tensioning force acting on the belt based on the actual load on the idler pulley means in dependence upon a value of the first signal, and for calculating drive power necesary for driving the vehicle accessories to calculate total drive torque of the vehicle accessories based on the calculated drive power in relation to a value of the second signal, the third means being arranged to calculate an optimum tensioning force based on a desired relationship between the optimum tensioning force and the total drive torque in consideration with the maximum efficiency of power transmission by the belt and being further arranged to generate a control signal therefrom when the calculated actual tensioning force is different from the calculated optimum tensioning force; and means responsive to the control signal from the third means for operating the actuator means in accordance with the difference between the calculated actual and optimum tensioning forces.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 5 depicts a graph indicative of drive power $P_C$ for the electromagnetic clutch mechanism in relation to the actual rotational speed N of the engine;

FIG. 6 illustrates a graph representing drive power $P_P$ for the power steering pump relative to the actual rotational speed N in consideration with fluid pressure P delivered from the pump;

FIG. 7 depicts a graph illustrating drive power $P_A$ for the alternator related to the rotational speed N in consideration with a load current $I_A$ from the alternator;

FIG. 8 depicts a graph illustrative of drive power $P_W$ for the water pump in relation to the rotational speed N;

FIG. 9 depicts a graph indicative of optimum tensioning force $T_R$ on the V-belt related to the total drive torque M in consideration with the maximum power transmission efficiency of the V-belt;

FIG. 10 illustrates a modification of the preferred embodiment shown in FIG. 2;

FIGS. 11, 12 and 13 are partial flow diagrams respectively illustrating the operation of the microcomputer shown in FIG. 10; and FIG. 14 depicts a graph indicative of drive power $P_A$ for the alternator related to the rotational speed N in consideration with a load current from the alternator.

DESCRIPTION OF THE PREFERRED EMBODIMENT

Figure 2:
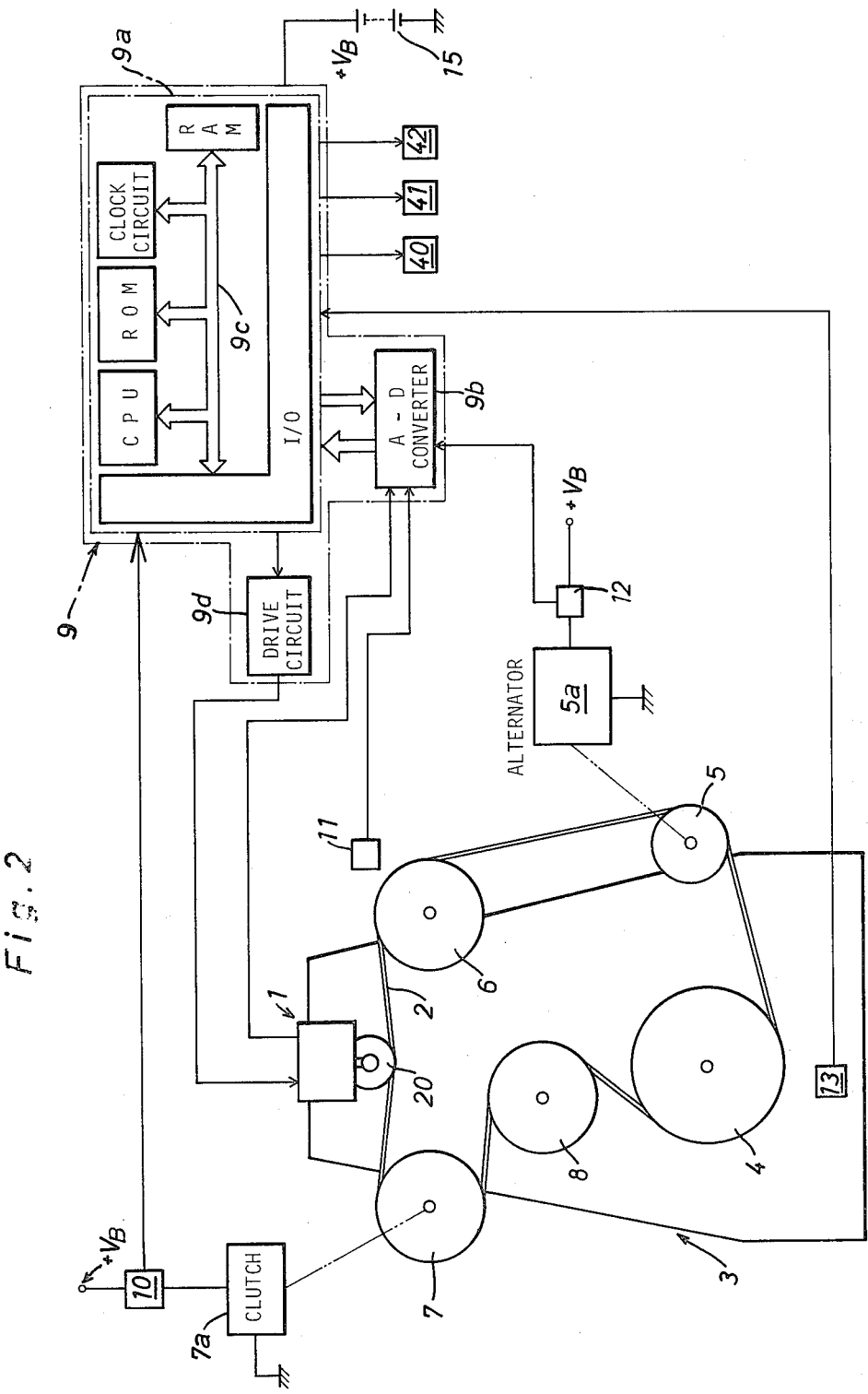
FIG. 2 is a schematic block diagram of a preferred embodiment in accordance with the present invention.

Referring now to FIG. 2 of the drawings, there is illustrated a block diagram of a preferred embodiment in accordance with the present invention which is adapted to a power transmission belt drive system for vehicle accessories such as an alternator 5a, a refrigerant compressor of a vehicle air conditioner, a power steering pump of a vehicle power steering mechanism, and a water pump for a vehicle engine 3. The drive system includes V-shaped belt pulleys 4 to 8 which have configurations and diameters determined by their associated engine accessory components and locations relative to each other. The belt pulleys 4 to 8 are supported on their respective engine components, which in turn are mounted on the engine 3 in a usual manner known in the prior art. The main driving pulley 4 is operatively coupled to a crankshaft of engine 3, and the pulley 5 is operatively coupled to the alternator 5a which serves to charge a vehicle battery 15 and cooperates with the battery 15 to provide an electric load current $I_A$ for various electric loads including an electromagnetic clutch mechanism 7a for the refrigerant compressor. The pulley 6 is operatively coupled to the power steering pump, the pulley 7 is operatively coupled to the clutch mechanism 7a to selectively drive the refrigerant compressor, and the pulley 8 is operatively coupled to the water pump for engine 3. The drive system also includes an endless transmission belt 2 of trapezoidal cross-section in the form of a V-belt which is guided over the pulleys 4 to 8 to transmit the output power from engine 3 to the above-noted vehicle accessories.

Figure 3:
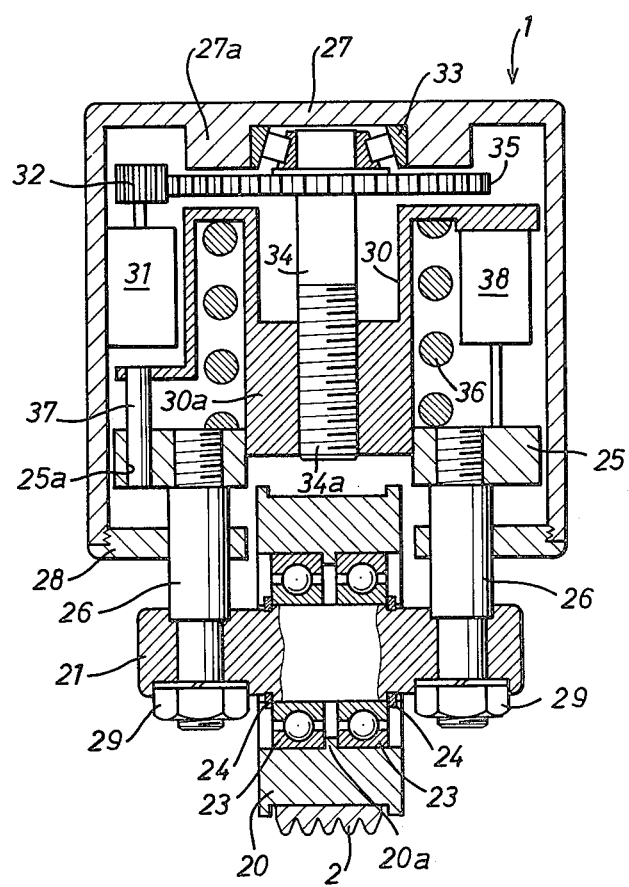
FIG. 3 is a cross-sectional view of the belt tensioner shown in FIG. 2.

A belt tensioner 1 is mounted on an upper portion of the engine 3 and engages the V-belt 2 at a location between the pulleys 6 and 7 under control of an electric control apparatus 9. As shown in FIG. 3, the belt tensioner 1 includes a cylindrical housing 27 in which a screw shaft 34 is journalled at its upper end by a tapered roller bearing 33 carried on an annular boss 27a of housing 27. The screw shaft 34 is provided thereon with a spur gear 35 of a large diameter which meshes with a pinion 32 to be driven by a stepper motor 31 secured to a cylindrical inner wall portion of housing 27. The screw shaft 34 is also provided thereon with a screwed portion 34a which is rotatably threaded into a cylindrical boss 30a formed on a movable member 30. The boss 30a of movable member 30 is slidably inserted into an annular piston 25 which is supported by way of a pair of piston rods 26, 26 from a cover plate 28 screwed into an outer end of housing 27. The movable member 30 is also provided thereon with a pin 37 which is slidably inserted into a through hole 25a of piston 35 to non-rotatably move the movable member 30 in the axial direction upon rotation of the screw shaft 34.

The piston rods 26, 26 are fastened at their inner screwed portions to the piston 25 and slidably extended outward through the cover plate 28 to support an idler pulley 20 by way of a pulley shaft 21 and a pair of ball bearings 23, 23. The piston rods 26, 26 are fastened at their outer screwed shoulder portions to both ends of pulley shaft 21 by a pair of nuts 29, 29 respectively. The idler pulley 20 is rotatably supported by a pair of the ball bearings 23, 23 carried on the pulley shaft 21 at a location between the piston rods 26, 26 and is held in tensioning engagement with the V-belt 2 due to resilient force of a compression spring 36 which is interposed between the piston 25 and the movable member 30. The ball bearings 23, 23 are locked on the pulley shaft 21 by a pair of circular clips 24, 24 and an annular shoulder portion 20a of idler pulley 20. Between the piston 25 and the movable member 30, a displacement sensor 38 in the form of a differential transformer is also provided to detect the actual relative displacement X of the piston 25 to the movable member 30 so as to produce an analog signal indicative of the detected displacement X. Additionally, the cover plate 28 is provided with a central opening in which the idler pulley 20 is permitted to locate at its upper portion.

The electric control apparatus 9 is provided with an analog-to-digital or A-D converter 9b connected to a pressure sensor 11, an ammeter 12 and the displacement sensor 38. The pressure sensor 11 detects the actual fluid pressure P generated from the power steering pump and produces an analog signal indicative of the detected fluid pressure P. The ammeter 12 serves to detect the actual electric load current $I_A$ flowing out from the alternator 5a and to produce an analog signal indicative of the detected load current $I_A$. The A-D converter 9b serves to convert the analog signals from pressure sensor 11, ammeter 12 and displacement sensor 38 into binary signals respectively indicative of the detected fluid pressure P, detected load current $I_A$ and detected displacement X in sequence. The electric control apparatus 9 is also provided with a microcomputer 9a which is connected to the A-D converter 9b, an ammeter 10 and a speed sensor 13. The ammeter 10 serves to detect a clutch current $I_C$ flowing into the clutch mechanism 7a from the alternator 5a and to produce the detected current $I_C$ as a current signal indicative of energization of the clutch mechanism 7a. The speed sensor 13 detects the actual rotational speed N of the crankshaft of engine 3 to produce a speed signal with a frequency proportional to the rotational speed N.

The microcomputer 9a receives the electric power from the battery 15 in response to actuation of an ignition switch for the vehicle to be ready for operation and includes a central processing unit or CPU which is connected through a bus line 9c to an input-output device or I/O, a read only memory or ROM, a random access memory or RAM and a clock circuit. The I/O receives selectively the binary signals from A-D converter 9b, the current signal from ammeter 10 and the speed signal from speed sensor 13 upon request of the CPU to temporarily store the same in the RAM. The clock circuit of microcomputer 9a is cooperable with a crystal oscillator (not shown) to produce a series of clock signals. The ROM serves to previously store therein a computer program to be executed by the CPU in accordance with a flow diagram shown in FIG. 4. The CPU is responsive to a series of the clock signals from the clock circuit of microcomputer 9a to repetitively execute the computer program such that it performs various operational processings, as described later, to generate first and second control signals and also to generate first to third alarm signals. In the embodiment, the first control signal is applied to a drive circuit 9d as one necessary for increase of the actual tensioning force T of V-belt 2, and the second control signal is also applied to the drive circuit 9d as one necessary for decrease of the actual tensioning force T of V-belt 2. The first to third alarm signals are applied to first to third warning lamps 40 to 42 respectively as ones necessary for informing the operator of abnormal condition of V-belt 2 or the vehicle accessories.

The drive circuit 9d is responsive to the first control signal from the CPU to generate a first drive signal indicative of clockwise rotation of the stepper motor 31 defining the increase of the actual tensioning force T and is also responsive to the second control signal from the CPU to generate a second drive signal indicative of counterclockwise rotation of the stepper motor 31 defining the decrease of the actual tensioning force T. The first to third lamps 40 to 42 are lit in response to the first to third alarm signals from the CPU respectively to inform the operator of the abnormal condition of the V-belt 2 or the vehicle accessories.

In operation, when the ignition switch is actuated to operate the electric control apparatus 9, the microcomputer 9a is ready for operation upon receipt of the electric power from the vehicle battery 15. Then, the CPU of microcomputer 9a enters the computer program at a step 50 in accordance with the flow diagram of FIG. 4 and, in turn, initializes various electric elements of microcomputer 9a at a step 51. When the computer program proceeds to a step 52, an analog signal indicative of the actual displacement X from displacement sensor 38 is converted by the A-D converter 9b into a binary signal which is temporarily stored in the RAM. When the computer program proceeds to the following step 53, the actual bearing load H of the idler pulley 20 is calculated by the CPU in relation to the actual displacement X from the RAM on a basis of the following equation (1) which is previously stored in ROM.

$$H = K(X_O + X) \quad (1)$$

where K is a spring constant of the compression spring 36, and $X_O$ is initial strain of the spring 36. Thereafter, CPU further calculates the actual tensioning force T in relation to the calculated bearing load H on a basis of the following equation (2) which is previously stored in the ROM.

$$T = bH \quad (2)$$

where b is a constant.

When the computer program proceeds to a step 54 for discriminating N>0, CPU discriminates as "NO" because the engine is inoperative at this stage. With the proceeding of the computer program to the following step 55 for discriminating the calculated tensioning force T relative to initial tensioning force $T_i$ stored previously in the ROM, the CPU serves to discriminate as "YES" in case the calculated tensioning force T is smaller than the initial tensioning force $T_i$. In the embodiment, the initial tensioning force $T_i$ is a predetermined value which indicates the total minimum drive torque necessary for driving the vehicle accessories without any slippage of the V-belt 2 on the pulleys 4 to 8. Then, the CPU generates at a step 55a a first signal upon receipt of which the drive circuit 9d produces a first drive signal. When the stepper motor 31 receives the first drive signal from drive circuit 9d, it rotates clockwisely to drive the pinion 32 in the same direction so that the spur gear 35 is rotated counterclockwisely to rotate the screw shaft 34 in the same direction. Then, the movable member 30 is moved downward in dependence upon the clockwise rotation of screw shaft 34 to displace the piston 25 downward due to increase of the resilient force of compression spring 36. Thus, the pulley shaft 21 is moved downward together with the piston rods 26, 26 due to the downward displacement of piston 25 to move the idler pulley 20 downward in such a manner to increase the actual tensioning force of V-belt 2 toward the initial value $T_i$, even if the belt 2 stretches due to lapse of time in its use.

When the computer program proceeds to a step 56 for discriminating the detected displacement X relative to the minimum displacement value $X_{min}$ stored previously in the ROM, the CPU discriminates as "NO" in case $X \geq X_{min}$, and proceeds the computer program to the following step 57 for discriminating as to $T = T_i$. In the embodiment, the minimum displacement value $X_{min}$ corresponds with the maximum resilient force of compression spring 36 which is defined by an abnormally increased value of the actual tensioning force of V-belt 2 caused by unexpected locked conditions of the vehicle accessories and the like. In case $T < T_i$ at this stage, CPU discriminates as "NO" at the step 57 to return the computer program to the step 52. When the calculated tensioning force T becomes the initial value $T_i$, CPU discriminates as "YES" at the step 57 to cease generation of the first control signal in such a manner that the stepper motor 31 stops together with the pinion 32 under control of the drive circuit 9d to stop the spur gear 35 and screw shaft 34. Thus, the piston 25 stops and cooperates with the piston rods 26, 26 and pulley shaft 21 to hold the idler pulley 20 at the location in which the controlled tensioning force of V-belt 2 is equal to the initial value $T_i$.

In case $X < X_{min}$ in the above-noted execution, the CPU discriminates as "YES" at the step 56 and ceases generation of the first control signal at the following step 59 such that the stepper motor 31 stops together with the pinion 32 under control of the drive circuit 9d to stop the spur gear 35 and screw shaft 34. Thus, the piston 25 stops together with the piston rods 26, 26 and pulley shaft 21 to inhibit further downward movement of the idler pulley 20. When the computer program proceeds to a step 60, the CPU serves to generate a first alarm signal upon receipt of which the first warning lamp 40 is lit to inform the operator of abnormal condition of the V-belt 2 or the vehicle accessories. This means that the abnormal condition of the V-belt 2 or the vehicle accessories has occurred at the initial setting of the V-belt 2.

In case the CPU discriminates as "NO" at the above-noted step 55, the computer program proceeds to a step 55b where the CPU generates a second control signal upon receipt of which the drive circuit 9d produces a second drive signal. When the stepper motor 31 receives the second drive signal from drive circuit 9d, it rotates counterclockwisely to drive the pinion 32 in the same direction so that the spur gear 35 is rotated clockwisely to rotate the screw shaft 34 in the same direction. Then, the movable member 30 is moved upward in dependence upon the counterclockwise rotation of screw shaft 34 to decrease the resilient force of compression spring 36. Thus, the idler pulley 20 is moved upward by the V-belt 2 together with the piston 25 against the decreased resilient force of compression spring 36 in such a manner to decrease the actual tensioning force of V-belt 2 toward the initial value $T_i$.

When the ignition switch is further actuated to crank the engine 3, the engine 3 is idled upon completion of its cranking to run the V-belt 2 along the pulleys 4 to 8 with the initial tensioning force $T_i$. This means that the vehicle accessories are driven by the respective pulleys 5 to 8 at the total minimum drive power without any slippage of the V-belt 2 on the pulleys 4 to 8. When the computer program proceeds to the step 52, a current signal and a speed signal with a frequency proportional to the actual rotational speed N are respectively produced from the ammeter 10 and speed sensor 13 and temporarily stored in the RAM. Analog signals indicative of the actual fluid pressure P, the actual load current $I_A$ and the actual displacement X are produced respectively from the pressure sensor 11, ammeter 12 and displacement sensor 38 are converted by the A-D converter 9b into binary signals in sequence which are stored in the RAM temporarily. At this stage, it is presumed that the clutch mechanism 7a is previously energized to connect the refrigerant compressor to the pulley 7.

When the computer program proceeds to the step 53, the CPU serves to calculate the actual bearing load H of the idler pulley 20 in relation to the actual displacement X from the RAM on a basis of the equation (1), to calculate the actual tensioning force T in relation to the calculated bearing load H on a basis of the equation (2), and also to calculate the actual rotational speed N based on the speed signals from the RAM. Upon calculation of the actual rotational speed N, a drive power $P_C$ for the refrigerant compressor is read out in relation to the calculated rotational speed N on a basis of a characteristic curve which defines a predetermined relationship between the actual rotational speed N and the drive power $P_C$, as shown in FIG. 5, and a drive power $P_P$ for the power steering pump is read out in relation to the calculated rotational speed N and the actual fluid pressure P from RAM on a basis of one of characteristic curves, each of which defines a predetermined relationship between the actual rotational speed N and the drive power $P_P$ in consideration with the actual fluid pressure P, as shown in FIG. 6.

Figure 1:
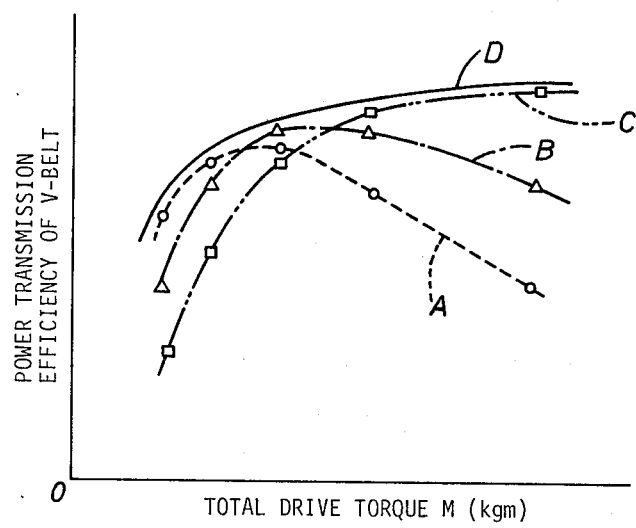
FIG. 1 depicts a graph indicative of power transmission effeciency of a V-belt relative to total drive torque M for the vehicle accessories in consideration with tensioning force on the belt.

A drive power $P_A$ for the alternator 5a is then read out in relation to the calculated rotational speed N and the actual load current $I_A$ from the RAM on a basis of one of characteristic curves, each of which defines a predetermined relationship between the actual rotational speed N and the drive power $P_A$ in consideration with the actual load current $I_A$, as shown in FIG. 7, and a drive power $P_W$ for the water pump is also read out in relation to the calculated rotational speed N on a basis of a characteristic curve which defines a predetermined relationship between the actual rotational speed N and the drive power $P_W$, as shown in FIG. 8. Thereafter, the CPU calculates a total drive torque M for the vehicle accessories in relation to the calculated rotational speed N and the read out drive powers $P_C$, $P_P$, $P_A$ and $P_W$ from the following equation (3) stored previously in the ROM.

$$M = n(P_C + P_P + P_A P_W)/N \qquad (3)$$

where n is a constant. In the embodiment, the characteristic curves shown in FIGS. 5 to 8 are respectively predetermined and stored in the ROM previously. Upon calculation of the total drive torque M, the CPU reads out an optimum tensioning force $T_R$ of the V-belt 2 in relation to the calculated drive torque M on a basis of a characteristic curve which defines a predetermined relationship between the optimum tensioning force $T_R$ and the total drive torque M, as shown in FIG. 9. In the embodiment, the characteristic curve of FIG. 9 is obtained from the characteristic curve D of FIG. 1 in relation to the characteristic curves A, B and C and stored previously in the ROM. Additionally, it is preferable to calculate the drive powers $P_P$, $P_A$ by using a conventional interpolation method in necessity.

When the computer program proceeds to the following step 54, the CPU discriminates as "YES" due to the calculated rotational speed N>0 to proceed the computer program to a step 61 for discriminating as to the calculated tensioning force T < the optimum tensioning force $T_R$. In case T<$T_R$, the CPU discriminates as "YES" to generate at the following step 62a a first control signal upon receipt of which the drive circuit 9d produces a first drive signal. Then, the spur gear 34 is rotated counterclockwisely by cooperation of the pinion 32 and stepper motor 31 responsive to the first drive signal from drive circuit 9d such that the screw shaft 34 is rotated in the same direction to move the movable member 30 downward against the resilient force of compression spring 36. Subsequently, the piston 25 is displaced due to increase of the resilient force of compression spring 36 to move the pulley shaft 21 downward and then to move the idler pulley 20 downward in such a manner to increase the actual tensioning force of V-belt 2 toward the optimum tensioning force $T_R$.

When the computer program proceeds to a step 63 for discriminating the calculated tensioning force T relative to the optimum tensioning force $T_R$, the CPU discriminates as "NO" in case T<$T_R$, and the computer program proceeds to a step 65 where the CPU discriminates the calculated tensioning force T relative to the maximum tensioning force $T_{max}$ stored previously in the ROM. In the embodiment, the maximum tensioning force $T_{max}$ is a determined value which defines abnormal conditions such as unexpected locked condition of the vehicle accessories and the like. In case $T \leq T_{max}$, the CPU discriminates as "NO" at the step 65 to proceed the computer program to a step 66 for discriminating as to the calculated tensioning force T < the minimum tensioning force $T_{min}$ stored previously in the ROM. In the embodiment, the minimum tensioning force $T_{min}$ is a predetermined value which defines abnormal condition such as partial breakage of the V-belt 2 and the like. In case $T \geq T_{min}$, CPU discriminates as "NO" at the step 66 to return the computer program to the step 52. Conversely, in case $T < T_{min}$, CPU discriminates as "YES" at the step 66 to generate a second alarm signal and cease generation of the first control signal at a step 68. Thus, the stepper motor 31 stops under control of the drive circuit 9d to stop the spur gear 35 and screw shaft 34 so that the piston 25 is stopped to inhibit further downward movement of the idler pulley 20. The second warning lamp 41 is also lit in response to the second alarm signal from CPU to inform the operator of the abnormal condition of the vehicle accessories or the V-belt 2.

In case $T \geq T_R$ in the above-noted execution, the CPU discriminates as "NO" at the step 61 to generate at a step 62b a second control signal upon receipt of which the drive circuit 9d produces a second drive signal. Then, the stepper motor 31 rotates counterclockwisely in response to the second drive signal form drive circuit 9d to drive the pinion 32 in the same direction so that the spur gear 35 is rotated clockwisely to rotate the screw shaft 34 in the same direction. Subsequently, the movable member 30 is moved upward in dependence upon the counterclockwise rotation of screw shaft 34 to decrease the resilient force of compression spring 36. Thus, the idler pulley 20 is moved upward by the V-belt 2 together with the piston 25 against the decreased resilient force of spring 36 in such a manner to decrease the actual tensioning force of V-belt 2 toward the optimum tensioning value $T_R$.

When the computer program proceeds to the step 63, the CPU discriminates as "NO" in case $T > T_R$, and then the computer program proceeds to the step 65 when the CPU to discriminates as "YES" if $T > T_{max}$. Upon this discrimination, the computer program proceeds to a step 67 where the CPU generates a third alarm signal and ceases generation of the second control signal. Thus, the stepper motor 31 stops under control of the drive circuit 9d to stop the spur gear 35 and screw shaft 34 so that the piston 25 stops to inhibit further upward movement of the idler pulley 20. The third warning lamp is also lit in response to the third alarm signal from the CPU to inform the operator of the abnormal condition of the vehicle accessories or the V-belt 2. Additionally, in case $T \leq T_{max}$ at the above-noted step 65, the CPU discriminates as "NO" to return the computer program to the step 52 through the step 66.

In case the calculated tensioning force T becomes equal to the optimum tensioning value $T_R$ when the computer program proceeds to the step 63 from one of the steps 62a, 62b, the CPU discriminates as "YES" to cease generation of the first or second control signal at a step 64 in such a manner that the stepper motor 31 stops together with the pinion 32 under control of drive circuit 9d to stop the spur gear 35 and screw shaft 34, as previously described. Thus, the piston 25 stops and cooperates with the piston rods 26, 26 and pulley shaft 21 to hold the idler pulley 20 at the location in which the controlled tensioning force of V-belt 2 is equal to the optimum tensioning force.

FIG. 10 illustrates a modification of the above embodiment in which a steering angular sensor 11a is connected to the A-D converter 9b in replacement of the pressure sensor 11 described above, and in which a main switch 70 for the vehicle air conditioner and first to third lighting switches 71, 72, 73 for a vehicle lamp load circuit 80 are respectively connected to the microcomputer 9a, the ammeter 12 being eliminated. The steering angular sensor 11a is in the form of a rotary potentiometer which detects the actual steering angle $\theta$ of the power steering mechanism and produces an analog signal indicative of the detected steering angle $\theta$ to be converted by the A-D converter 9b into a binary signal indicative of the steering angle $\theta$. The main switch 70 is actuated to produce a first command signal necessary for energizing the clutch mechanism 7a, and the lighting switches 71, 72 and 73 are actuated to produce second, third and fourth command signals respectively necessary for lighting vehicle tail, low-beam and high-beam lamps 81, 82 and 83, each of which the lamp load circuit 80 is provided with.

Figure 4:
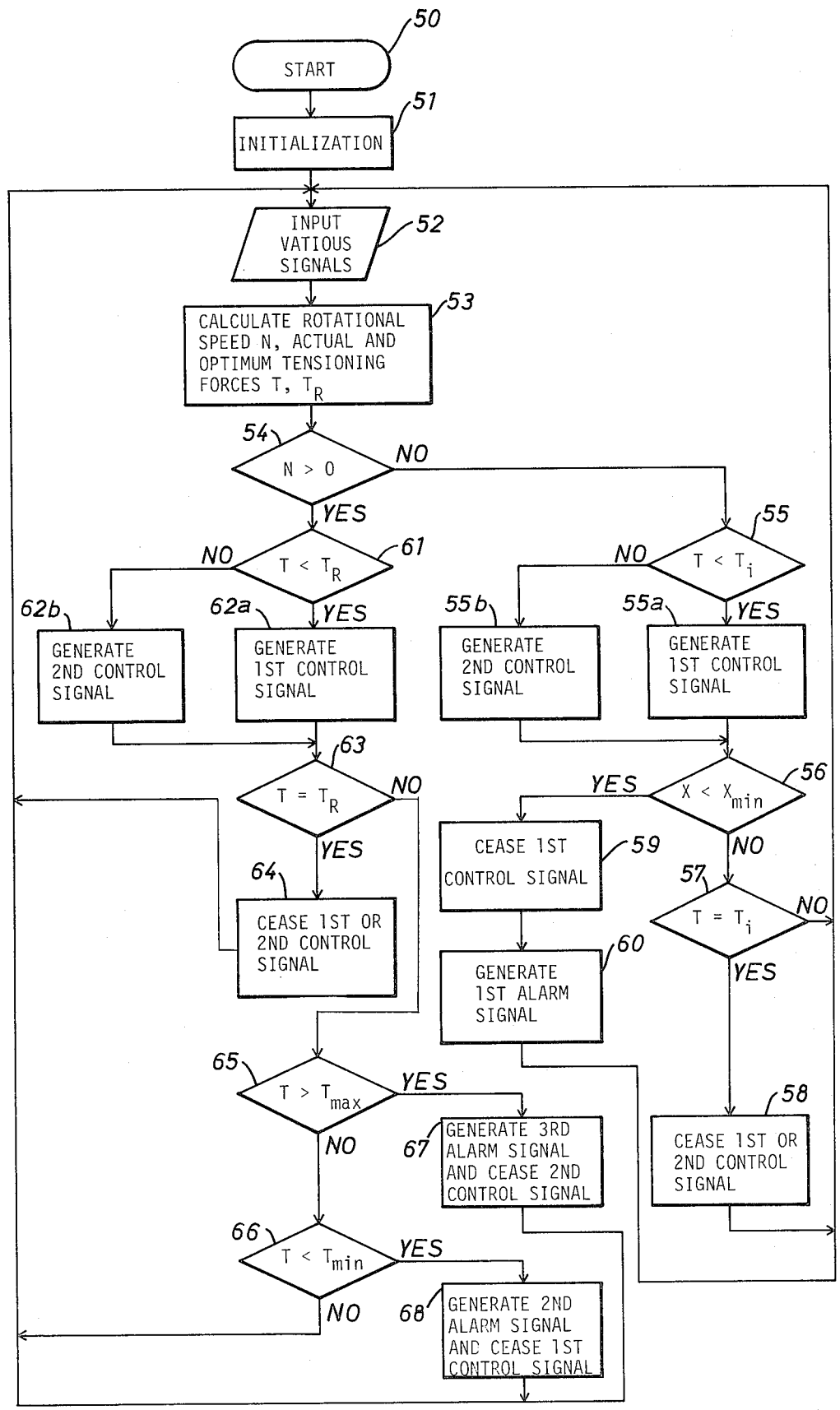
FIG. 4 is a flow diagram illustrating the operation of the microcomputer shown in block form in FIG. 2.

The lamp load circuit 80 is also provided with a switching circuit 84 connected between the alternator 5a and the tail lamp 81, with a switching circuit 85 connected between the alternator 5a and the low-beam lamp 82, and with a switching circuit 86 connected between the alternator 5a and the high-beam lamp 83. The switching circuit 84 is activated to light the tail lamp 81, the switching circuit 85 is activated to light the low-beam lamp 82, and the switching circuit 86 is activated to light the high-beam lamp 83. A switching circuit 90 is connected to the clutch mechanism 7a in replacement of the ammeter 10 to be activated to apply the clutch current $I_C$ from the alternator 5a to the clutch mechanism 7a. In the modification, the I/O of microcomputer 9a further receives the first to fourth command signals respectively from the main and lighting switches 70 to 73 to apply the same to the CPU. The I/O also receives the binary signal indicative of the steering angle $\theta$ from A-D converter 9b to temporarily store the same in the RAM. The computer program defining the flow diagram of FIG. 4 is partly modified as shown by partial flow diagrams in FIGS. 11, 12. During repetitive execution of the modified computer program, the CPU further generates an energization signal for activating the switching circuit 90 and to generate first to third lighting signals for respectively activating the switching circuits 84 to 86.

In operation, when the modified computer program proceeds to a step 52a of FIG. 11 during travelling of the vehicle toward evening, a speed signal from the speed sensor 13 is stored in the RAM, and analog signals indicative of the actual displacement X and actual steering angle $\theta$ respectively from sensors 38 and 13 are converted by the A-D converter 9b into binary signals which are stored in the RAM in sequence. At this stage, it is presumed that the main and lighting switches 70 to 73 are actuated to generate first to fourth command signals respectively. When the modified computer program proceeds to a step 52b, the CPU resets a flag C indicative of actuation of the main switch 70 and resets flags $A_1$, $A_2$ and $A_3$ respectively indicative of actuation of the lighting switches 71, 72 and 73. With the proceeding of the modified computer program to the following step 52c for discriminating as to actuation of the main switch 70, the CPU discriminates as "YES" because the main switch 70 has been already actuated, and the CPU sets the flag C at a step 52d. When the computer program proceeds to a step 52e for discriminating as to actuation of the first lighting switch 71, the CPU discriminates as "YES" on a basis of the second command signal from lighting switch 71 to set the flag $A_1$ at a step 52f. When the modified computer program proceeds to a step 52g for discriminating as to actuation of the second lighting switch 72, the CPU serves to discriminate as "YES" to set the flag $A_2$ at a step 52h. When the modified computer program further proceeds to a step 52i for discriminating as to actuation of the third lighting switch 73, the CPU discriminates as "YES" in relation to the fourth command signal from lighting switch 73 to set the flag A₃ at the following step 52j.

When the modified computer program proceeds to the following step 53 shown by the diagrams of FIGS. 4, 11, the CPU calculates the actual bearing load H of the idler pulley 20 in relation to the actual displacement X from RAM on a basis of the equation (1), to calculate the actual tensioning force T in relation to the calculated bearing load H on a basis of the equation (2), and also to calculate the actual rotational speed N based on the speed signals from the RAM. Upon calculation of the actual rotational speed N, a drive power $P_C$ for the refrigerant compressor is read out by the CPU in relation to the calculated rotational speed N on a basis of the characteristic curve of FIG. 5, and a drive power $P_P$ for the power steering pump is read out by the CPU in relation to the calculated rotational speed N and the actual steering angle $\theta$ from RAM on a basis of characteristic curves, each of which is similar to each of the characteristic curves of FIG. 6 and defines a predetermined relationship between the actual rotational speed N and the drive power $P_P$ in consideration with the actual steering angle $\theta$. In the embodiment, the actual steering angle $\theta$ corresponds with the actual fluid pressure P.

A drive power $P_W$ for the water pump is then read out by the CPU in relation to the calculated rotational speed N on a basis of the characteristic curve of FIG. 8. Furthermore, the total of load current values $I_{A1}$, $I_{A2}$ and $I_{A3}$ respectively necessary for lighting the tail, low-beam and high-beam lamps 71, 72 and 73 is calculated by the CPU in relation to the second to fourth command signals from lighting switches 71, 72 and 73, and a drive power $P_A$ for the alternator 5a is read out by the CPU in relation to the calculated rotational speed N and the total load current values $I_{A1}+I_{A2}+I_{A3}$ on a basis of a characteristic curve $l_3$ which defines a predetermined relationship between the actual rotational speed N and the drive power $P_A$ in consideration with the total load current values $I_{A1}+I_{A2}+I_{A3}$, as shown in FIG. 14. The load current values $I_{A1}$, $I_{A2}$ and $I_{A3}$ are predetermined respectively and stored previously in the ROM. FIG. 14 depicts a characteristic curve $l_1$ which defines a predetermined relationship between the actual rotational speed N and the drive power $P_A$ in consideration with the load current value $I_{A1}$, and also depicts a characteristic curve $l_2$ which defines a predetermined relationship between the actual rotational speed N and the drive power $P_A$ in consideration with the total of the load current values $I_{A1}$ and $I_{A2}$. The characteristic curves $l_1$ and $l_2$ are previously stored in ROM together with the characteristic curve $l_3$. In addition, the characteristic curve $l_1$ (or $l_2$) is utilized when requested to read out a drive power $P_A$ for the alternator 5a under actuation of the lighting switch 71 (or lighting switches 71 and 72).

When the drive power $P_A$ is read out, as previously described, the CPU serves to calculate a total drive torque M for the vehicle accessories in relation to the calculated rotational speed N and the read out drive powers $P_C$, $P_A$, $P_P$ and $P_W$ from the equation (3) and also read out an optimum tensioning force $T_R$ of V-belt 2 in relation to the calculated drive torque M on a basis of the characteristic curve of FIG. 9. Thereafter, the CPU performs the execution of the modified computer program mainly through the steps 53, 61, 63 and 66 repetitively to generate one of first and second control signals in response to which the belt tensioner 1 cooperates with the drive circuit 9d to automatically control the actual tensioning force T toward the optimum tensioning value $T_R$. When the CPU discriminates as "YES" at the step 63 during the above repetitive execution, it ceases generation of one of the first and second control signals at the step 64 in such a manner to proceed the modified computer program to a subroutine 100 for controlling the refrigerant compressor and the lamp load circuit 80 (see FIGS. 12 and 13). In other words, the modified computer program proceeds to the subroutine 100 after the actual tensioning force T of V-belt 2 has been maintained equal to the optimum tensioning value $T_R$ under control of the belt tensioner 1. This means that the modified computer program proceeds to the subroutine 100, the pulley 7 has been driven by the V-belt 2 to permit transmission of the read out drive power $P_C$ from engine 3 to the refrigerant compressor and also that the alternator 5a has been driven by the V-belt 2 to permit provision of the electric power corresponding with the total load current values $I_{A1}+I_{A2}+I_{A3}$ and with the clutch current $I_C$.

When the modified computer program proceeds to a step 101 for discriminating as to setting of the flag C, as shown in FIG. 13, the CPU discriminates as "YES" because the flag C has been already set, and the modified computer program proceeds to a step 102 where the CPU generates an energization signal upon receipt of which the switching circuit 90 is actuated to provide the clutch current $I_C$ to the clutch mechanism 7a from the alternator 5a. Thus, the clutch mechanism 7a is engaged to transmit the drive power $P_C$ from the pulley 7 to the refrigerant compressor. This means that the refrigerant compressor is smoothly driven by the pulley 7 without any slippage of the V-belt 2 on the pulley 7, because the modified computer program proceeds to the subroutine 100 after the actual tensioning force T of V-belt 2 has become the optimum tensioning force $T_R$, even if the belt tensioner 1 delays in its responsibility to one of the first and second drive signals from the drive circuit 9d.

When the computer program proceeds to a step 104 for discriminating as to setting of the flag $A_1$, the CPU discriminates as "YES" because the flag $A_1$ has already set, and generates at a step 105 a first lighting signal upon receipt of which the switching circuit 84 is actuated to light the tail lamp 81. With the proceeding of the modified computer program to a step 107 for discriminating as to setting of the flag $A_2$, the CPU discriminates as "YES" because the flag $A_2$ has been already set, and generates at a step 108 a second lighting signal upon receipt of which the switching circuit 85 is actuated to light the low-beam lamp 82. When the computer program further proceeds to a step 110 for discriminating setting of the flag $A_3$, the CPU discriminates as "YES" because the flag $A_3$ has been already set, and generates a third lighting signal at a step 111. Then, the switching circuit 86 is responsive to the third lighting signal from CPU to light the high-beam lamp 83. In this case, the alternator 5a is smoothly driven by the pulley 5 without any slippage of the V-belt 2 on the pulley 5 due to the same reason as that at the above-noted driving operation of the refrigerant compressor. Additionally, if the main and lighting switches 70 to 73 are released to cease generation of the first to fourth command signals respectively during the above repetitive execution, the CPU to discriminates as "NO" at the steps 101, 104, 107 and 110 in sequence to cease generation of the energization signal and the first to third lighting signals.

Although in the above embodiment and modification the actual resilient force of the compression spring 36 is controlled by the movable member 30 in dependence upon rotation of the screw shaft 34, it may be also controlled by the movable 30 in dependence upon fluid pressure delivered from a fluid pressure source. In this case, a potentiometer may be adapted as the displacement sensor 38, and a load transducer of the strain gauge type is interposed between the piston 25 and the compression spring 36 to directly detect the actual bearing load H of the idler pulley 20 and also to eliminate the displacement sensor 38. Additionally, in the modification, when the vehicle air conditioner generates a command signal necessary for energizing the clutch mechanism 7a in relation to the difference between the actual and desired temperatures within the vehicle compartment, the command signal from the vehicle air conditioner may be applied to the microcomputer 9a in replacement of the first command signal from the main switch 70.

Although the present invention has been illustrated and described in connection with a specific embodiment, various adaptation and modifications will become apparent to those skilled in the art from the description in conjunction with the appended claims without departing from the scope and spirit of the present invention.

What is claimed is:

1. In combination with a belt tensioner device for use in automotive vehicles for automatically controlling tension of an endless belt of a drive system in which an output torque of a prime mover of the vehicle is transmitted to a plurality of accessory devices by means of said belt, said belt tensioner device including idler pulley means in engagement with said endless belt to apply a tensioning force on said belt in accordance with radial displacement thereof, and actuator means operatively connected with said idler pulley means for effecting radial displacement of said idler pulley means toward and away from said belt, an electric control apparatus for said belt tensioner device comprising:
first means for generating a first signal indicative of the radial displacement of said idler pulley means;
second means for generating a second signal indicative of rotational speed of said prima mover;
third means for calculating an actual tensioning force acting on said belt in dependence upon a value of said first signal, and for calculating drive powers respectively necessary for driving said vehicle accessory devices in relation to a value of said second signal from said second means, and for calculating a total drive torque for said vehicle accessory devices in relation to the value of said second signal and all the calculate drive powers, said third means being arranged to calculate an optimum tensioning force related to said calculated total drive torque for said accessory devices on a basis of a predetermined relationship between the optimum tensioning force and said total drive torque in consideration with a maximum efficiency of power transmission by said belt and being further arranged to generate a control signal therefrom when the calculated actual tensioning force is different from the calculated optimum tensioning force; and
means responsive to the control signal from said third means for operating said actuator means in accordance with the difference between the calculated actual and optimum tensioning forces.

2. An electric control apparatus as claimed in claim 1, wherein said third means is further arranged to generate an alarm signal therefrom when the calculated actual tensioning force is out of a predetermined range defined by minimum and maximum allowable tensioning forces on said belt; and further including warning means responsive to said alarm signal from said third means for informing an operator of an abnormal condition in the operation of said drive system.

3. An electric control apparatus as claimed in claim 2, wherein said third means is arranged to generate a second alarm signal therefrom when a value of said first signal from said first means is larger than a value indicative of a maximum displacement of said idler pulley means toward said belt under an inoperative condition of said prime mover; and further including second warning means responsive to said second alarm signal from said third means for informing the operator of an abnormality of the initial condition in operation of said drive system.

4. An electric control apparatus as claimed in claim 1, further comprising manual switch means associated with said third means to generate a command signal for activation of an electric load circuit of the vehicle, and wherein said third means is arranged to generate an output signal for effecting the activation of said load circuit in response to said command signal after the calculated actual tensioning force is adjusted to the calculated optimum tensioning force.

5. An electric control apparatus as claimed in claim 1, wherein said third means is arranged to calculate a load acting on said pulley means in relation to a value of said first signal and to calculate an actual tensioning force acting on said endless belt based on said calculated load.

6. In combination with a belt tensioner device for use in automotive vehicles for automatically controlling tension of an endless belt in a drive system in which an output torque of a prime mover of the vehicle is transmitted to a plurality of accessory devices by means of said belt, said belt tensioner device including idler pulley means in engagement with said endless belt to apply a tensioning force on said belt in accordance with radial displacement thereof, and actuator means operatively connected with said idler pulley means for effecting radial displacement of said idler pulley means toward and away from said belt, an electric control apparatus for said belt tensioner device comprising:
first means for generating a first signal indicative of the radial displacement of said idler pulley means;
second means for generating a second signal indicative of rotational speed of said prime mover;
process means for
(1)
process means for
memorizing an initial optimum tensioning force on said belt under an inoperative condition of said prime mover,
(2) calculating a load acting on said pulley means in relation to a value of said first signal, for calculating an actual tensioning force acting on said belt based on said calculated load, and for generating a first control signal therefrom when the calculated actual tensioning force is different from the memorized initial optimum tensioning force, (3) calculating drive powers respectively necessary for driving said accessory devices in relation to a value of said second signal from said second means and for calculating a total drive torque for said accessory devices in relation to the value of said second signal and all the calculated drive powers, and (4) determining an optimum tensioning force related to said calculated total drive torque for said accessory devices on a basis of a predetermined relationship between said optimum tensioning force and said total drive torque in consideration with a maximum efficiency of power transmission by said belt and being further arranged to generate a second control signal therefrom when the calculated actual tensioning force is different from said determined optimum tensioning force; and operator means responsive to said first control signal from said processing means for operating said actuator means in accordance with the difference between the memorized initial optimum tensioning force and the calculated actual tensioning force, said operator means being further responsive to said second control signal from said processing means for operating said actuator means in accordance with the difference between the determined optimum tensioning force and the calculated actual tensioning force.

* * * * *